Dec. 14, 1937.   H. I. MORRIS   2,101,914
CHECK SIGNER
Filed June 15, 1935   2 Sheets-Sheet 1
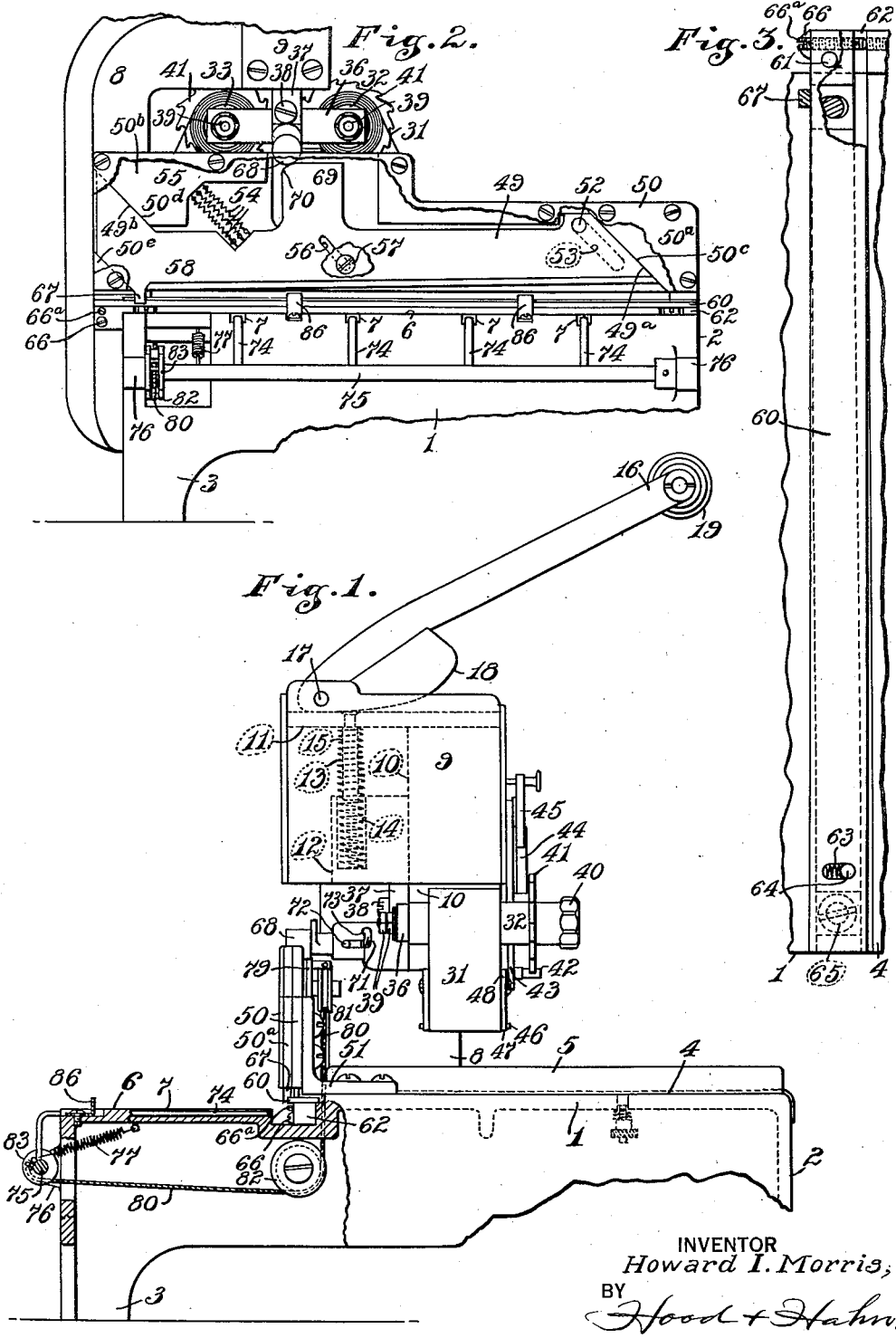
INVENTOR
Howard I. Morris,
BY Hood + Hahn
ATTORNEYS Dec. 14, 1937. H. I. MORRIS 2,101,914
CHECK SIGNER
Filed June 15, 1935 2 Sheets-Sheet 2
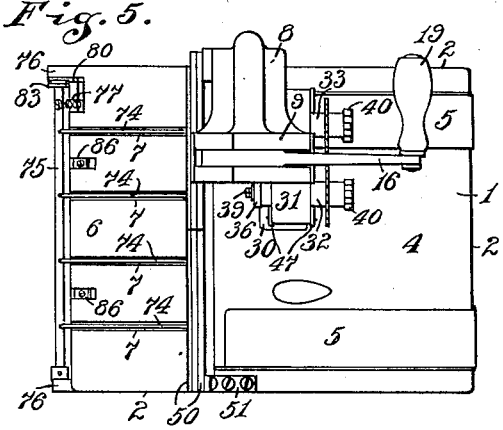
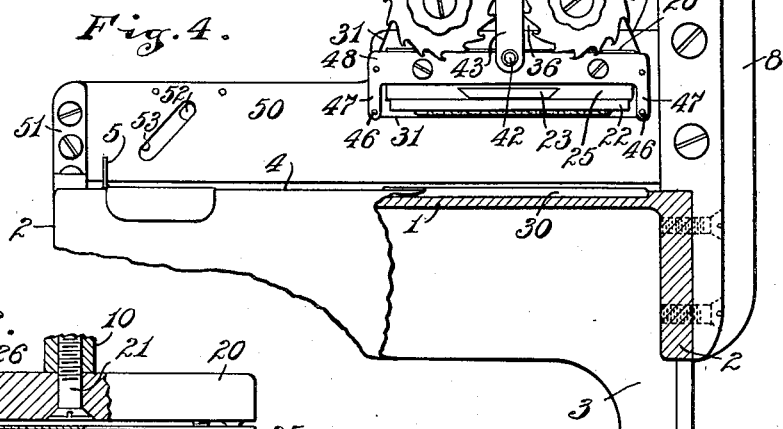
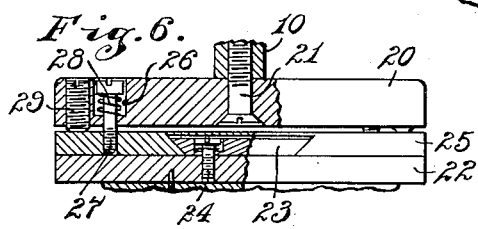
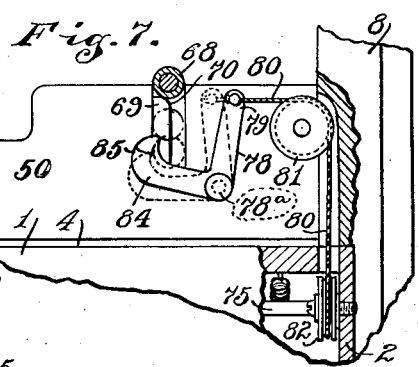
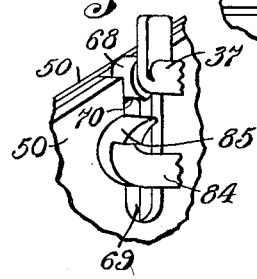
INVENTOR
Howard I. Morris,
BY
Hood + Hahn
ATTORNEYS Patented Dec. 14, 1937

2,101,914

UNITED STATES PATENT OFFICE 2,101,914

CHECK SIGNER

Howard I. Morris, Indianapolis, Ind.

Application June 15, 1935, Serial No. 26,729

10 Claims. (Cl. 101—316)

My invention relates to printing machines and particularly to that type of printing machines known as check signers.

In organizations where a large number of checks are issued, it is sometimes the custom, instead of the officer authorized to sign checks actually affixing his signature by pen and ink, to provide a facsimile of the signature of the officer and impress the same on the checks, after they have been written, by means of a check signer.

In those machines which have heretofore been developed in the commercial art, the cutting and stacking is limited to a definite number of checks in strips only, and is not adaptable to all types of checks, and furthermore the machines are extremely complicated and expensive to manufacture.

It is one of the objects of my invention to provide a check signer which shall be extremely simple in construction, which shall provide means for signing single, voucher, strip or continuous form checks, cutting the checks from the sheets or continuous form on which they are, as a rule, printed, after the signature impression has been made, and to then lay the checks over, one on top of the other, face down, so that the checks will be stacked in numerical order in the same sequence which they are fed through the machine.

Heretofore it has been the commercial custom to print the checks on sheets having four or five or more checks printed thereon and these sheets have been perforated between checks to permit them to be separated. The tearing off of the checks from the sheets after they have been signed consumes a considerable amount of time and the cost of perforation of the sheets adds to the cost of printing the checks. By the use of my machine I have eliminated the necessity for perforating the check sheets and am enabled to cut the checks as they are fed through the machine and, as heretofore stated, stack the checks one on top of the other in numerical order as they are fed through the machine, thereby facilitating the handling of the checks, by eliminating the time required to tear them apart and stack them numerically.

For the purpose of disclosing my invention I have illustrated an embodiment of my invention in the accompanying drawings, in which, Fig. 1 is a side elevation of my check signer, parts of the same being broken away to show details;

Fig. 2 is a rear elevation of my machine, likewise having parts broken away to show details;

Fig. 3 is a detail plan of the knife bed;

Fig. 4 is a front elevation of the machine;

Fig. 5 is a plan view thereof;

Fig. 6 is a detail view partly in section of the signature supporting head;

Fig. 7 is a detail view, in front elevation, of the knife operating means; and

Fig. 8 is a detail perspective of the knife operating means.

In the machine illustrated, I provide a bed 1, on which the various parts are mounted and this bed has downwardly extending side walls 2 terminating in feet 3. The reception side 4 of the bed is provided at its opposite sides with transversely adjustable guide plates 5 between which the checks are adapted to be fed forwardly on the bed and that portion 6 of the bed on which the checks are delivered after having been severed is preferably disposed at a lower level than the feed portion 4 and is provided in its upper surface with a series of slots 7 for a purpose more fully hereinafter to appear.

Extending upwardly from one side of the bed is an arm 8 adapted to support the printing head. This arm or bracket 8 may be bolted to one of the side walls of the bed and overhangs the bed, as shown in Fig. 4, carrying a supporting head 9 for the impression mechanism of the signer. Reciprocably mounted within the head 9 is a plunger 10 having extending therefrom an arm 11 between which and a stationary block 12, arranged in the head 9, is a coiled spring 13 for maintaining the plunger 10 in its retracted or raised position. This coiled spring preferably sockets in a recess 14 in the block 12 and surrounds a guide pin 15 secured to the arm 11. The plunger 10 is moved downwardly by an operating lever 16 pivoted at 17 in the head 9 and provided with a cam face 18 so arranged that as the outer end of the arm 16 is depressed through manipulation of a handle 19, the cam 18 will engage the arm 11, depressing the plunger which will be returned to its normal or retracted position under the influence of the spring 15.

The lower end of this plunger 10 carries a head 20 to which the impression plate may be attached. The head 20 may be integrally formed with the plunger, or may be secured to the lower end by means of machine screws such as 21. The signature is secured upon the face of a plate 22 having a dovetail rail 23 secured on its upper face preferably by machine screws such as 24 and this dovetail rail engages in a dovetail groove formed in a receiving plate 25 which in turn is adapted to be mounted upon the head 20. To this end the head 20 is provided with a series of countersunk openings 26 through which are adapted to project machine screws 27 engaging the plate 25. These screws have interposed between their heads and the bottom of the countersunk opening 26 coiled springs 28 which hold the plate 25 against the face of the head 20. In order that the plane of the plate 25 may be adjusted to insure an even printing of the signature, the plate 25 bears on three adjusting screws 29. These screws extend through the head 20 and there are preferably two at one edge of the head and one intermediate of the ends of the head at the other edge so that a three-point bearing is provided. By adjusting one or all of these screws the even impression of the signature may be insured and compensation made for slight irregularities in the bed. At the point in the bed where the signature impression impinges upon the bed I provide a rubber or other resilient inserts such as 30.

The signature is inked by a ribbon which is adapted to pass across the face thereof, the impression, as a matter of fact, being made through this ribbon. To this end, the ribbon 31 is mounted on a pair of rotatable spools 32 and 33. These spools extend from and are carried by a cross arm 36 which is clamped to one face of the plunger 10 by a bracket clamp 37 held in position by a machine screw 38 which extends through the bracket clamp and through the cross arm and into the plunger. The shafts on which the spools are mounted extend through this cross arm and are preferably held in position by nuts 39. The forward ends of the spools are preferably knurled as at 40 to permit manual rotation thereof and each spool is provided with a ratchet wheel 41 adapted to be engaged by a pin 42 on the end of an arm 43 pivoted to the head 9. This arm has a spring connection 44 with a swinging lever 45 mounted on the same pivot as the arm 43 so that by the swinging of the lever 45 to one side or the other of its center, the pin 42 on the end of the lever 43 will be thrown into the path of one or the other of the ratchets 41 on their return movement for the purpose of rotating the ribbon spool and causing a feed of the ribbon in one direction or the other. The ribbon from the spools passes down over a pair of guide spindles 46 on the lower ends of arms 47 secured on plates 48 fastened to the front and back of the head 20.

After the impression has been made upon the check by the depression of the plunger 10, the sheet is fed forward to position the next succeeding check for receiving an impression and upon the making of an impression on this second check the first check is severed from the sheet. To this end, I provide a severing knife 49 disposed at right angles to the bed and mounted between a pair of housing plates 50 which in turn are secured to the bed by supporting brackets 51 at one end and to the arm 8 at the other end. The knife is guided in its movement between the plate and has imparted thereto a diagonal movement with respect to the bed to impart a shearing action by means of a pair of guide blocks 50a and 50b. The toe end of the knife is provided with an angularly disposed edge 49a which cooperates with an angularly disposed edge 50c on block 50a and a similarly arranged edge 49b which cooperates with an angularly disposed edge 50d. A third guide block 50e with an inclined edge is arranged to cooperate with an inclined edge at the heel of the knife. A guide pin 52, near one end thereof, operating in an angularly disposed slot 53 formed in one of the guide plates 50 insures an angular movement of the knife on its down stroke. The knife is retained in its retracted position by means of coiled springs 54 connected at one end to the back of the knife and at the other end to a stationary part 55 on one of the guide plates 50. I also provide an angularly disposed guide slot 56 in the knife through which a pin 57, passing through the housing plates, is adapted to extend. The guide pin 52 and the guide slot 56 insure an angular movement of the knife toward the bed, thereby providing a slicing cut for the knife, with the heel 58 of the knife descending toward cutting position slightly in advance of the toe of the knife. The knife cooperates with a slice bar 60 fitting within the slice bar receiving slot or groove in the bed I and pivoted at 61, near the heel of the knife, to an adjusting plate 62. The free end of the slice bar, that is the end toward the toe of the knife, is biased in a projected position or a position for engagement with the side of the knife by means of a coiled spring 63 arranged in a slot in the slice bar and bearing at one end on a pin 64 in the adjustment plate 62 and one end of the slot in the bar. The adjustment plate 62 is pivotally secured to the bed, at one end, by a securing screw 65 and is provided at its opposite end with adjusting screw 66 threaded into the side wall of the bed groove so that the heel end of the plate may be adjusted toward or from the heel of the knife, thereby insuring the initial contact of the slice bar at the heel end of the knife with the knife as it descends. An additional set screw 66a passes through the adjustment plate 62 above the screw 66 and bears on the side wall of the groove to assist in holding the blade in its proper position. As the knife descends, having first engaged the heel end of the slice bar, the knife will bear strongly against the face of the slice bar, the slice bar being pushed thereagainst by the spring 63. To insure the engagement of the heel of the knife with the slice bar, I provide on the heel end of the knife a lug or projection 67 which, even when the knife is in its retracted position, projects over the face of the slice bar.

The knife is projected into cutting position by the downward movement of the plunger 10 and to this end the plunger is provided with an arm 68 adapted to engage an upwardly extending projection 69 on the back of the knife with a slight camming action on the rounded edge 70 of this projection to assist in providing the slicing movement of the knife heretofore described. This arm 68 preferably is in the form of a plunger which extends into a socket in the bracket member 37 and which is maintained in its projected position through the instrumentality of a coiled spring 71 which is interposed between the back of the arm 68 and the bottom of the socket in which it operates. The arm is provided with a pin 72 operating in a bayonet slot 73 so that the arm may be retracted against the action of the spring and held in its retracted position by the movement of the pin in the bayonet slot in order to render the arm ineffective for depressing the knife when the machine is used for signing single or voucher checks.

In order that the check, after having been severed by the knife and which has dropped down on the portion 6 of the bed plate, may be removed from this portion and deposited face down, I provide a series of oscillating fingers 74 which preferably lie in slots or grooves 7 in the portion 6 of the bed plate below the surface of the portion 6. These fingers are mounted upon an oscillating shaft 75 mounted in brackets 76 extending from the rear end of the bed and maintained in a position with the fingers 74 in a retracted position by means of a coiled spring 77 attached at one end to a pin extending from the shaft and at the other end to the under side of the bed portion 6. The fingers 74 are oscillated upon the depression of the plunger 10 in making an impression but do not commence their movement until after the knife has severed the check from the sheet and there is a sufficient lost motion in this operation to permit the completion of the impression stroke of the plunger without further manipulation of the fingers. The advantage of this will be apparent when it is understood that it is sometimes necessary, at the latter part of the impression stroke, to depress the plunger rapidly and with considerable force to make a clear and distinct signature impression and if this speedy last movement of the plunger should likewise impart a corresponding movement to the last part of the throw of the fingers, proper positioning of the checks might not result.

To the end that the fingers 74 may be oscillated by the depression of the knife, I provide a bell crank lever 78 pivotally mounted on the pin 78a heretofore described.

One arm 79 of this lever has connected thereto a cable 80 passing over suitable guide rollers or pulleys 81 and 82 and connected to a drum 83 on the end of the shaft 75, being first wrapped partially around the drum as shown in Fig. 1. The arm 84 of this lever is provided with a cam projection 85 adapted to be engaged during a part of its descent by the same arm 68 which operates the knife. During the initial movement of this arm 68 in its operation of the knife, it will not engage the cam portion of the arm 84, therefore the knife will sever the check before the arm 68 commences to manipulate the oscillating fingers 74. As the arm 68 engages the cam member 85 it will cause the bell crank lever 78 to oscillate, thereby oscillating the fingers as long as it is in engagement with the cam or hook portion 85 but as soon as the arm 68 passes the cam or hook portion 85 it will slide along this portion 85 without further depressing the arm 84 and without further affecting the movement of the fingers 74 which, by this time, have reached the limit of their oscillation in one direction.

In order to insure the proper positioning of the checks on the bed portion 6 and to prevent them from sliding off from the end before they are picked up by the oscillating fingers, I provide stop fingers 86 at the delivery edge of the bed.

The operation is obvious. A sheet of checks is fed along the bed portion 4 until the initial check is positioned beneath the plunger. The plunger is then moved downwardly by the operating arm 16 to make an impression. As soon as this plunger is retracted the sheet is fed forward placing the signed check over the bed portion 6. The next move of the plunger to make a second impression severs the first check printed from the sheet and at the same time impresses the second sheet, also operating the fingers 74 to pick the initial check up off the bed and deposit the same in the rear of the machine facing down.

I claim as my invention:

1. In a check signer, the combination with a bed, of a reciprocating plunger mounted above said bed and having impression means, severing means at the delivery end of said bed, means for removing the severed check from said bed, and means operated by the movement of the said head in making an impression for successively operating said severing means and said removing means.

2. In a check signer, the combination with a bed, of a reciprocating plunger mounted above said bed and having impression means mounted thereon, a reciprocating knife at the delivery end of said bed, means for removing the severed check from said bed, and means operated by the movement of said head in making an impression for successively operating said knife and said removing means.

3. In a check signer, the combination with a bed, of a reciprocating plunger mounted above said bed and having impression means mounted thereon, severing means at the delivery end of said bed, oscillating pickup fingers at the delivery end of said bed and beyond said severing means for removing the severed check from said bed, and means operated by the movement of said head in making an impression for successively operating said severing means and oscillating said pickup fingers.

4. In a check signer, the combination with a bed, of a reciprocating plunger mounted above said bed and having impression means thereon, a reciprocating knife at the delivery end of said bed and oscillating pickup fingers at the delivery end of said bed beyond said knife, and means operated by the movement of the said head in making an impression for successively moving said knife in a severing direction and oscillating of said fingers to remove the severed check from said bed.

5. In a check signer, the combination with a bed, of a reciprocating plunger mounted above said bed and having impression means mounted thereon, severing means at the delivery end of said bed, oscillating fingers for removing the severed checks from said bed, and means operated by said reciprocating plunger for oscillating said means in a removing direction after said severing means has been operated, said operating means remaining quiescent during the final stroke of said plunger in making an impression.

6. In a check signer, the combination with a bed, of a reciprocating plunger mounted above said bed and having impression means mounted thereon, a reciprocating knife mounted at the delivery end of said bed, oscillating fingers mounted at the delivery end of said bed beyond said knife, an operating lever for oscillating said fingers, and means on said plunger for engagement with said lever on the down stroke of the plunger for operating said oscillating means in a delivery direction and a lost motion connection between said plunger and lever permitting said lever to remain quiescent during the final impression movement of said plunger.

7. In a check signer, the combination with a bed, of a reciprocating plunger having impression means mounted thereon arranged above said bed and movable toward said bed for making an impression, means at the delivery end of said bed for severing the check, and means operated by said plunger after an impression has been made for removing the severed check from said bed comprising oscillating fingers arranged to lie parallel with and below the surface of the delivery end of the bed, an oscillating shaft mounted at the delivery end of the bed and below the surface thereof and connecting members between said fingers and said shaft extending at right angles to said fingers and projecting downwardly into engagement with said shaft.

8. In a check signer, the combination with a bed, of a reciprocating plunger mounted above said bed and having impression means, a knife extending transversely of said bed beyond said impression means, oscillating fingers mounted beyond said knife, an engaging member mounted on said plunger, and means for respectively operating said knife and said oscillating fingers successively engaged by said engaging means for operating the same.

9. In a check signer, the combination with a bed, of a reciprocating plunger mounted above said bed and having impression means, a knife extending transversely of said bed beyond said impression means, oscillating pick-up fingers mounted beyond said knife, an engaging member mounted on said plunger, a member on said knife normally in the path of said engaging means and diagonally movable out of the path of said engaging means as the knife is operated, and an operating member for said oscillating fingers normally in the path of said engaging means and movable out of the path thereof as said engaging means moves in one direction.

10. In a check signer, the combination with a bed, of a reciprocating plunger mounted above said bed and having impressions, a knife extending transversely of said bed beyond said impression means, oscillating pick-up fingers beyond said knife, an engaging member on said plunger, means for imparting to said knife a diagonal movement, means on said knife normally in the path of said engaging means and movable out of the path thereof by the diagonal movement of the knife, and means for operating said pick-up fingers in a position to be engaged by said engaging means after the knife has been operated.

HOWARD I. MORRIS.